United States Patent [19]

Carson et al.

[11] 4,182,741

[45] Jan. 8, 1980

[54] FLUID DISTRIBUTOR FOR FIXED-BED CATALYTIC REACTION ZONES

[75] Inventors: Don B. Carson, Mt. Prospect; Frank V. Purse, Northfield, both of Ill.

[73] Assignee: UOP Inc., Des Plaines, Ill.

[21] Appl. No.: 904,141

[22] Filed: May 9, 1978

[51] Int. Cl.² .............................................. B01J 8/02
[52] U.S. Cl. ................................... 422/211; 208/146; 422/191; 422/194; 422/220
[58] Field of Search ............ 23/284, 288 R; 208/146; 422/191, 194, 211, 220, 172, 176

[56] References Cited

U.S. PATENT DOCUMENTS

| | | | |
|---|---|---|---|
| 1,987,903 | 1/1935 | Houdry | 23/288 R |
| 2,234,169 | 3/1941 | Houdry et al. | 23/288 R |
| 2,632,692 | 3/1953 | Korin et al. | 23/288 R |
| 2,860,955 | 11/1958 | Kassel | 23/288 R |
| 3,208,833 | 9/1965 | Carson | 23/288 R |
| 3,458,289 | 7/1969 | King et al. | 23/288 R |
| 3,694,169 | 9/1972 | Fawcette et al. | 23/288 K X |
| 3,929,421 | 12/1975 | Werges | 23/288 R X |
| 3,977,834 | 8/1976 | Alcock et al. | 23/288 R |
| 4,087,282 | 5/1978 | Strahorn et al. | 23/288 R |

*Primary Examiner*—Joseph Scovronek
*Assistant Examiner*—Roger F. Phillips
*Attorney, Agent, or Firm*—James R. Hoatson, Jr.; Robert W. Erickson; William H. Page, II

[57] ABSTRACT

A distributor device for effecting uniform distribution of a fluid stream to a fixed-bed of catalyst particles. Distribution of a vaporous phase, liquid phase, or a mixed-phase is effected in a plurality of spaced-apart parallel conduits, each of which consists of two concentric and coaxial perforated pipes. Fluid for distribution is introduced into the inner conduit, while fluid from that portion of catalyst above the device flows into the outer conduit and is distributed therefrom into the catalyst particles below.

8 Claims, 6 Drawing Figures

Figure 3
Figure 4
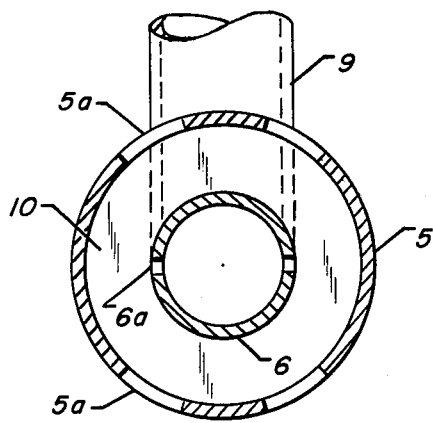
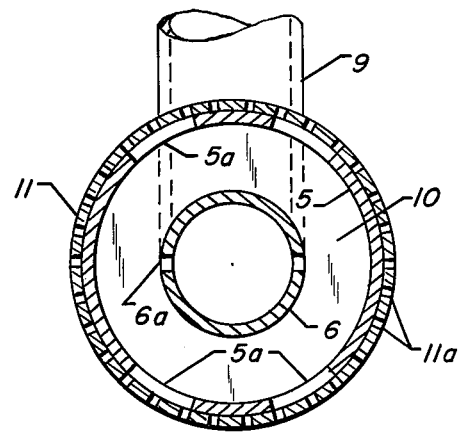
Figure 5
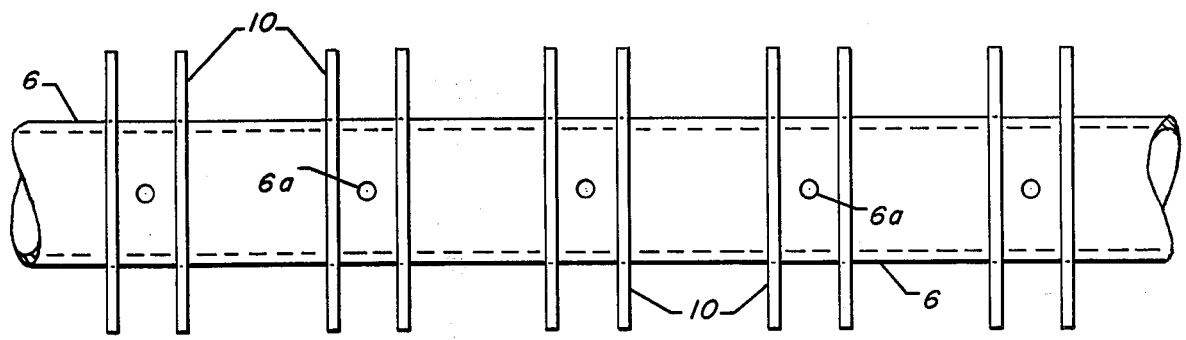
Figure 6
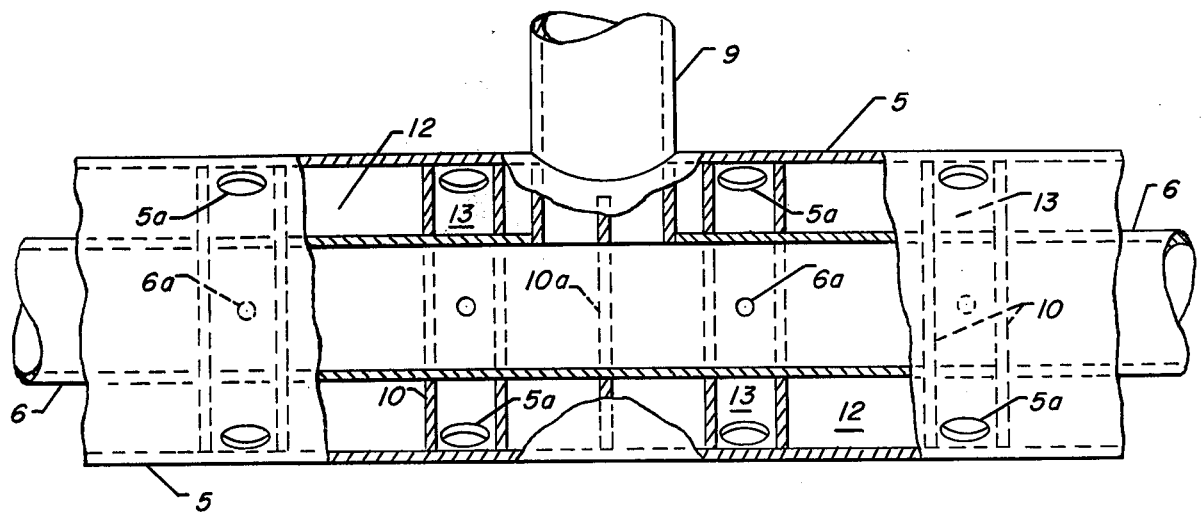

FLUID DISTRIBUTOR FOR FIXED-BED CATALYTIC REACTION ZONES

APPLICABILITY OF INVENTION

The fluid distributor encompassed by our inventive concept is intended for utilization in processes widely practiced within the petroleum and petrochemical industries, and particularly those processes which are effected through the use of fixed-bed catalytic reaction zones. More specifically, the present fluid distribution device is applicable for the inner-catalyst distribution of a heating medium in a principally endothermic process, or a quench (cooling) stream in an exothermic process. Applicable to those processes effected in vapor phase, liquid phase and mixed-phase, the distributor serves to introduce, into the reaction zone, a liquid, vapor, or a mixed vapor/liquid stream. In the interest of clarity and brevity, but without the intent to so limit our invention, further description and discussion will be directed toward the introduction of a vaporous quench stream in an exothermic process which is conducted in mixed-phase.

Mixed-phase hydrocarbon conversion reactions are generally effected in exothermic processes where the fresh feed charge stock predominates in hydrocarbons boiling above the gasoline, or naphtha boiling range—i.e. above a temperature of 400° F. at atmospheric pressure. Often, the mixed-phase reactant stream will consist of liquid hydrocarbon constituents and a hydrogen-rich vaporous phase. Charge stocks include kerosene fractions, light and heavy gas oils (both atmospheric and vacuum) and asphaltenic black oils containing constituents boiling above about 1050° F. Obviously, our invention does not rely for viability upon a particular hydrocarbonaceous charge stock, nor upon the particular reaction, or reactions being effected. The latter include hydrocracking, hydrogenation, desulfurization and/or denitrogenation, hydrotreating and various combinations thereof, all of which are hydrogen-consuming and, therefore, principally exothermic in nature. Although the distributor herein described is capable of uniformly distributing the reactant stream as the same is initially introduced into the catalytic reaction vessel, it is primarily intended for the inner-catalyst introduction of a fluid quench, or cooling stream.

Paramount to successful hydrogen-consuming, mixed-phase processing, is the uniform distribution of the reactant stream throughout the bed of catalyst particles. This is especially true at those loci within the catalyst bed at which the quench stream is introduced. Tantamount to hydrogen-consuming reactions is the continuous contact of the hydrocarbon phase with hydrogen throughout the bed of catalyst particles. At the points of quench stream introduction, whether liquid or vaporous, it is also important to distribute the quench stream uniformly into the reactant stream to insure equally important uniform quenching of the reactant stream, or uniform heat transfer to the quench stream. The distributing device encompassed by our inventive concept readily achieves these necessary results.

OBJECTS AND EMBODIMENTS

A principal object of our invention is to provide a device for distributing a fluid uniformly to a bed of catalyst particles. A corollary objective is to distribute an external fluid stream uniformly into a reactant stream traversing a fixed-bed of catalyst particles.

More specifically, in an exothermic reaction system, an object is to afford uniform heat transfer from the reactant stream to the fluid quench stream introduced intermediate the bed of catalyst particles. Another object is to provide an intimate thorough mixture of an external fluid stream with the internal reactant stream.

These, and other objects of the present invention, are readily achieved in a fixed-bed catalytic reaction chamber through the use of a fluid distribution device which, in one embodiment, comprises in cooperative relationship (a) a fluid inlet conduit; (b) a first plurality of spaced-apart, perforated fluid distribution conduits in open communication with said fluid inlet conduit and disposed in a plane perpendicular to the vertical plane containing the axis of said fluid inlet conduit; and, (c) a second plurality of perforated fluid distribution conduits, having a nominal diameter greater than said first distribution conduits, one each of which is coaxially and concentrically disposed around each of said first distribution conduits. This embodiment may be additionally characterized in that the fluid distribution device occupies from about 60.0% to about 90.0% of the horizontal cross-sectional area of the reaction chamber.

Other objects and embodiments of the present invention will become evident from the following detailed description thereof, particularly when read in conjunction with the several accompanying drawings. In one such other embodiment, annular-form, spaced-apart discs, or washers, having a major diameter substantially the same as the internal diameter of the second (larger) distribution conduits, surround the first distribution conduits (smaller) and are disposed substantially perpendicular to the longitudinal axis thereof.

CITATION OF RELEVANT PRIOR ART

It must be recognized and acknowledged that the prior art abounds with a side variety of fluid distribution devices to introduce (1) a mixed-phase, or single phase reactant stream into a catalytic reaction zone, (2) a vaporous and/or liquid quench, or heating stream at one or more intermediate loci within a fixed-bed of catalyst particles and, (3) the mixed-phase effluent from an upper catalyst bed into the next succeeding lower catalyst bed. A perusal of the appropriate Classes 23-288 and 208-146 indicates that such is the case. Many of the prior art fluid distributing devices utilize a horizontal plate through which a plurality of downcomers extend. This technique is illustrated by U.S. Pat. No. 3,146,189 (Cl. 208-146), issued Aug. 25, 1964, U.S. Pat. No. 3,378,349 (Cl. 23-288), issued Apr. 16, 1968, and U.S. Pat. No. 3,524,731 (Cl. 23-288). These are mentioned only to illustrate the variety of fluid distribution devices available; therefore, copies thereof have not been included with this application.

The configuration of our device, in plan view (as shown in FIG. 1), is referred to in the art as a "spider", due to its similarity to a web. Likenesses are also found in the prior art as shown by U.S. Pat. No. 2,632,692 (Cl. 23-288), issued Mar. 24, 1953. Here the spider is situated in a catalyst-free area between two horizontal, perforated plates. In this instance, the device consists of a pair of concentric, perforated toroidal rings connected to each other by a cross conduit which, in turn, communicates with the inlet conduit which supplies the quenching fluid. It will be noted that each toroidal ring is unitary in and of itself; that is, the device does not contemplate a second such ring totally within the confines of the first.

The spider shown in U.S. Pat. No. 2,860,955 (Cl. 23–288), issued Nov. 18, 1958, more closely resembles our fluid distribution device (the plan view shown in FIG. 2). Here, the inlet conduit tangentially introduces the mixed-phase fluid stream into a separation zone. Liquid components flow downwardly into a horizontal header which in turn feeds a plurality of perpendicularly-disposed, perforated distribution conduits. Again, each of the distribution conduits is unitary in construction. Nowhere is there recognition of conduits comprising two concentrically and coaxially disposed pipes.

U.S. Pat. No. 3,208,833 (Cl. 23–288), issued Sept. 28, 1965, offers a fluid distribution device which resembles that of U.S. Pat. No. 2,632,692 above discussed. Here, however, the device, consisting of a multiplicity of concentric, perforated rings, rectangular in cross-section, is capable of being back-flushed for removal of a retained fluid. These ring sections are interconnected through a plurality of short hollow tubular members which distribute the feed fluid through all of the spaced-apart distributing rings. It is again noted that all of the distributing rings are of unitary construction.

The foregoing three delineated references, copies of which accompany this application, are all directed toward the inter-catalyst bed distribution of a fluid medium; they are, therefore, appropriate to the subject matter of the present application. In summation, there exists no teachings and/or recognition of the device described herein, in which each of the distribution conduits consists of a pair of concentrically and coaxially disposed perforated conduits. As hereinafter indicated, such prior art devices are substantially improved by the concept upon which the present invention is founded.

SUMMARY OF INVENTION

As hereinbefore set forth, the fluid distribution device of the present invention is adaptable for utilization in those fixed-bed catalytic systems in which the reactions are effected in vapor phase, liquid phase or in mixed phase. Additionally, the device may be utilized to distribute the reactant stream initially into the reaction chamber, or to distribute a heating medium, or quenching stream at one or more intermediate loci within the bed of catalyst particles. The following discussion will be directed toward a mixed-phase exothermic reaction chamber wherein the exothermicity of reaction is controlled, or tempered through the use of a vaporous hydrogen quench. Distribution of a quench stream to a fixed-bed of catalyst particles, in accordance with the invention herein described and claimed, is founded upon recognition of the fact that provisions have not heretofore been afforded which will alleviate the myriad of difficulties and problems associated with (1) uniform and thorough mixing of the quench stream with the flowing reactant stream and, (2) uniform transfer of heat to the quench stream throughout the cross-sectional area of the catalyst particles at the various quench introduction loci.

In further describing our invention, both ranges of and specific dimensions will be given. It is understood that these are presented solely for illustration purposes, and not with the intent to limit the present invention, the scope and spirit of which is defined by the appended claims.. The precise design of a fluid distribution device as herein described is dependent upon a multiplicity of considerations pertinent to the particular process with which the device is to be integrated. These include at least the following: the physical and chemical characteristics of the charge stock, or reactant stream; the character of the reactions being effected, and the intended product quality; the charge stock feed rate; the dimensions of the catalytic reaction chamber; the quantity of the catalyst disposed therein; and, the degree of exothermic reaction experienced.

In accordance with the present invention, the quench stream is introduced into the reaction chamber through an inlet conduit which is in open communication with a plurality of perforated distribution conduits, each of which is encased within an outer perforated conduit having a larger nominal internal diameter. That is, each quench distribution conduit consists of a pair of coaxially axially and concentrically disposed perforated pipes. The quench inlet conduit is in direct communication only with the smaller, or inner distribution conduit, and is disposed, or aligned with the diameter of the reaction chamber. Double-pipe distribution conduits are spaced apart, and disposed in a plane which is perpendicular to the vertical plane containing the central axis of the quench inlet conduit. The quench distribution conduits may take the form of toroidal rings, similar to those shown in the art, or of individual conduits closed at both ends. In the latter configuration, the central axes of the distribution conduits will be parallel chords of the reaction chamber.

In the more conventional quench distribution devices, difficulties have arisen as a result of heat-distortion of the "spider", or uneven catalyst loading and distribution. This results in discharge from the conduits into various portions of the catalyst bed which are functioning at variant pressures, and thus leads to non-uniform heat distribution. Furthermore, distortion of the spider permits flow from high pressure areas to lower pressure areas, again contributing to poor heat distribution, as well as non-uniform mixing throughout the bed of catalyst particles. The co-tubular, double-pipe distribution conduits of the present device readily afford the solutions to these problems. Distortion under high-severity operating conditions is virtually non-existent by virtue of the provision of the larger, outer conduit.

Distortion of the spider with resulting non-uniform flow is additionally eliminated by providing annular-form, spaced-apart stabilizing discs, or washers, around the inner pipe, which washers have a major diameter substantially the same as the internal diameter of the outer, larger conduit, and which are disposed substantially perpendicular to the longitudinal axis thereof. Perforations in the inner and outer conduits are contained within individual internal chambers formed between a pair of stabilizing discs. Thus, the quench fluid discharging from a given perforation in the inner pipe can only be admitted into the catalyst through those perforations in the outer conduit which are between the same pair of stabilizing discs. Also provided thereby are annular stagnant areas between perforations which tend to impede the transfer of heat to the quench fluid. In other words, the quench fluid is not heated as it traverses the inner distribution conduit towards the extremities thereof.

Fluid distribution devices will be designed for a pressure drop of about 5.0 to about 15.0 psig. through the perforations in the smaller, inner conduit which have a diameter in the range of from about 1/32-inch to about 5/32-inch. The perforations in the inner conduit are disposed 90° with respect to the vertical axis, and generally two such apertures are confined within each individual internal chamber formed by a pair of the stabilizing washers. The perforations in the larger, outer distribution conduit have a nominal diameter of from ⅜-inch to about ⅞-inch and are preferably chamfered inwardly (toward the center of the conduit). These are disposed 30° with respect to the vertical axis, and from two to about four are confined within each individual internal chamber. Thus, the smaller apertures are positioned such that they discharge from the inner conduit onto an imperforate inner surface of the outer conduit. The entire fluid distribution device will occupy from about 60.0% to about 90.0% of the horizontal cross-sectional area of the bed of catalyst particles. The ratio of the diameter of the outer conduit to that of the inner conduit will be in the range of about 2.0:1.0 to about 4.0:1.0.

In passing the quench vapors at high velocity into the catalyst bed, precautions are required to prevent excessive attrition of the catalyst particles. With respect to the present fluid distribution device, the velocity of the vapors emanating from the apertures in the inner conduit is broken by discharging against an imperforate area of the outer conduit. By encircling the outer pipe with a perforated screen member, the velocity is again broken as the vapors discharge into the catalyst bed. Intimate, uniform mixing of the fluid quench and the internal reactant stream is accomplished by locating the outer conduit perforations 30° with respect to the top and bottom of the vertical axis. This promotes the flow of the reactant stream at the precise points of quench introduction. The design utilizes the jet effect of the quench vapors exiting through the small perforations to effectively pump the reactant stream through the individual internal chambers between the pairs of stabilizing washers. Additionally, the entire quench apparatus blocks a significant portion of the catalyst bed cross-section, such that there is a relatively high pressure drop through the catalyst bed in the spaces between individual quench conduits. This pressure drop also encourages the flow of the reactant stream through the annulus at the quench point, rather than through the catalyst.

In further describing the fluid distribution device encompassed by our inventive concept, reference will be made to the several accompanying drawings which illustrate the various embodiments thereof. Since the drawings are presented for the sole purpose of providing a clear understanding of the distributor, its construction and its operation, they have not been drawn to a precise scale. As previously stated herein, the dimensions of a particular device are dependent upon a wide variety of processing considerations as well as the particular dimensions of the catalytic reaction chamber.

In one specific design, for use in a catalytic reaction chamber having an effective internal diameter of about twelve feet, twenty-five double-pipe distribution conduits are utilized. These are disposed on approximate 5-inch centers with approximately one and one-half inches between adjacent conduits. The inner conduit has a diameter of about one inch, and the apertures therein are 1/16-inch in diameter; the outer conduit has a diameter of three inches, and the apertures therein are ⅜-inch in diameter. Within each of the individual internal chambers formed by a pair of stabilizing discs one inch apart, there are two 1/16-inch apertures and four ⅜-inch apertures. The apertures are three inches apart, measured center to center along the axis of the conduit.

BRIEF DESCRIPTION OF DRAWING

FIG. 3 is a partially-sectioned enlarged end view of the distribution conduits; FIG. 4 is identical, but shows the outer conduit 5 encased in a cylindrical perforated screen 11.

FIG. 5 is a side elevation of inner conduit 6, showing the relationship between stabilizing washers 10 and apertures 6a.

FIG. 6 is a partially-sectioned side elevation of a portion of one of the distribution conduits, illustrating the spacial relationship of the various elements.

DETAILED DESCRIPTION OF DRAWINGS

Figure 1:
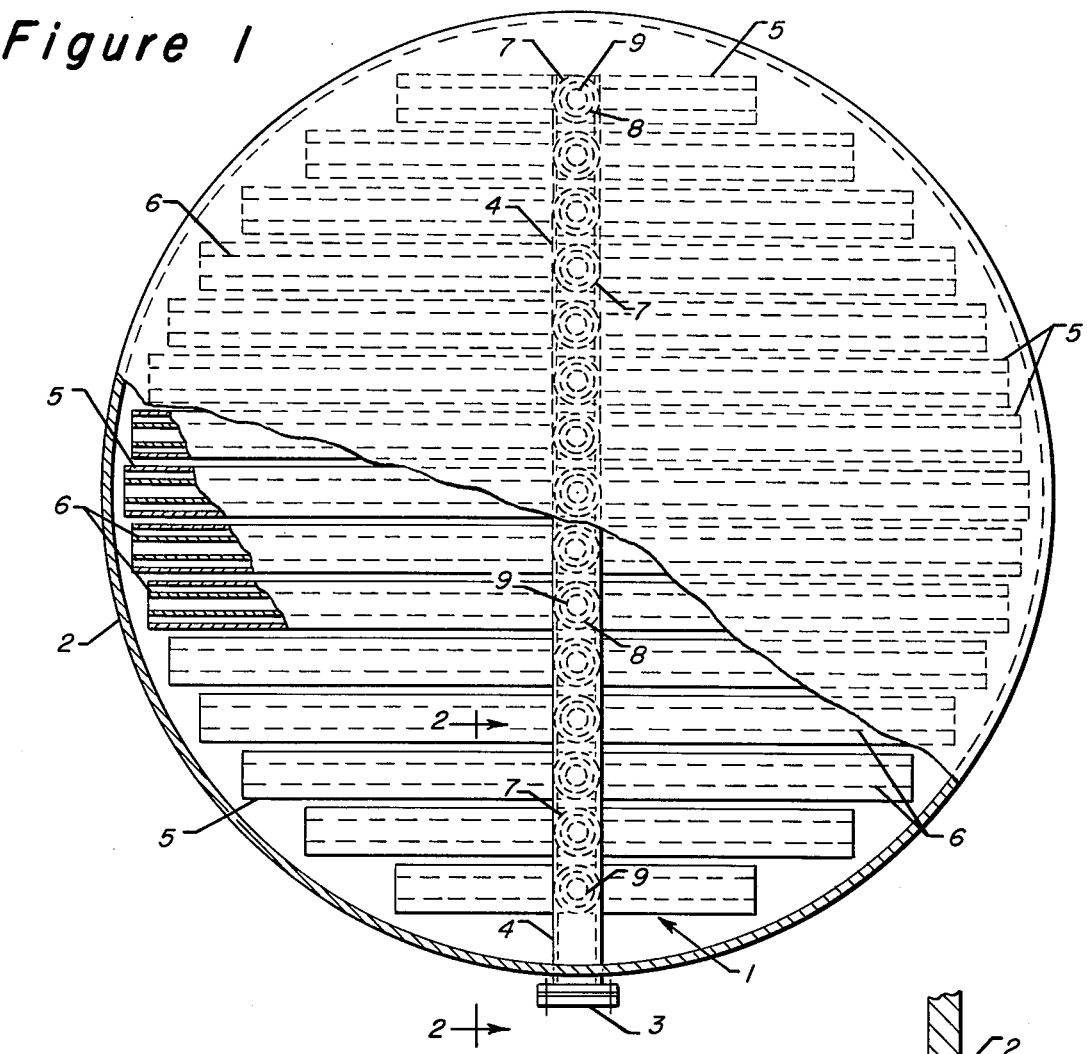
FIG. 1 is a plan view of the present fluid distributor, indicated generally by the numeral 1, disposed within a reaction chamber 2.

With specific reference now to the accompanying drawings, FIG. 1 shows a plan view of the fluid distributing device 1 within a catalytic reaction chamber 2. The fluid quench stream is introduced by way of inlet port 3 and inlet conduit 4. In this illustration of a preferred embodiment, fluid inlet conduit 4 is shown as traversing the reaction zone through the center, and as being substantially the same length as the diameter thereof. A plurality of fluid distribution conduits, consists of an outer pipe 5 and a smaller inner pipe 6, are disposed below inlet conduit 4, and lie in a common plane which is perpendicular to the vertical planes containing the central axis of the inlet conduit. As more clearly shown in FIG. 2, fluid inlet conduit 4 communicates directly only with inner distribution conduit 6 by way of reducing couplings (or unions) 7. In the plan view of FIG. 1, the entire device occupies approximately 80.0% of the cross-sectional area of catalytic reaction chamber 2.

Figure 2:
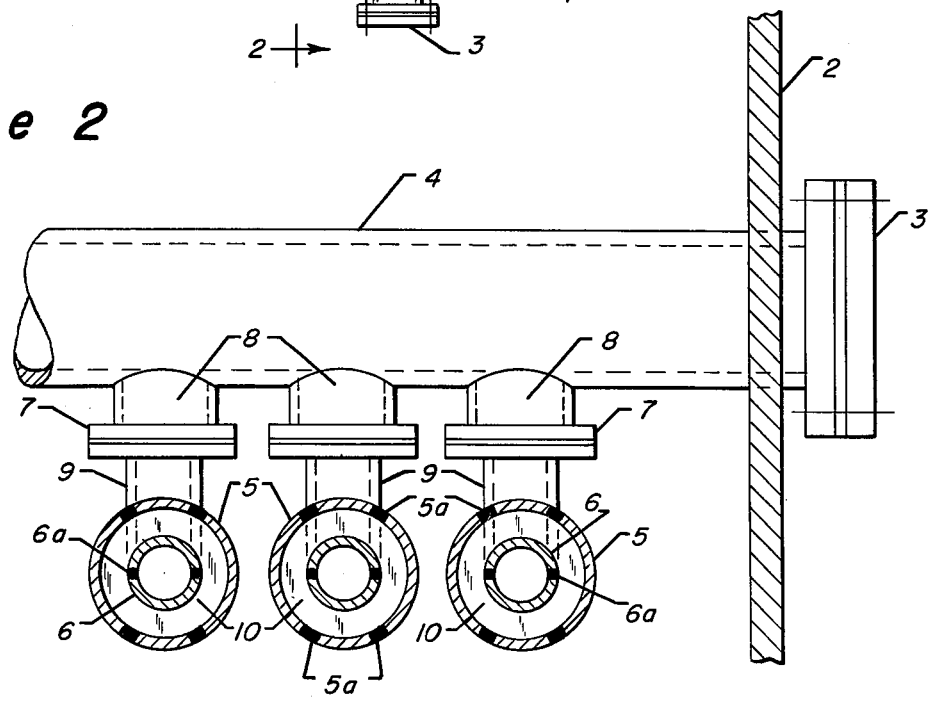
FIG. 2 is a sectioned elevation of distributor 1 taken substantially along the line 2—2 of FIG. 1.

FIG. 2 is a partially sectioned side elevation taken substantially along the line 2—2 of FIG. 1. The fluid quench stream passes from inlet conduit 4 through short vertical pipes 8, reducing coupling 7 and pipes 9 into inner distribution conduit 6; vertical pipes 9 are generally of the same size as conduits 6. A pair of apertures 6a, disposed 180° with respect to each other, discharge the quench stream onto an imperforate portion of outer distribution conduit 5 which contains four apertures 5a, each of which is disposed 30° with respect to the vertical axis.

The spacial relationships of distribution conduits 5 and 6, as well as apertures 5a and 6a, are illustrated in FIGS. 3 and 4, enlarged for clarity. Also shown in these views is a stabilizing disc 10 and the perforated screen member 11 which surrounds outer distribution conduit 5. The jet action of the quench fluid discharging through apertures 6a effectively pumps the reactant stream through apertures 5a, and intimately admixes therewith by virtue of discharging against the imperforate portion of outer conduit 5. The apertures 11a in perforated screen member 11 are sized to inhibit the passage of catalyst particles therethrough.

FIG. 5 is a side elevation of the inner distribution conduit 6 having the stabilizing discs, or washers 10 in place. As shown, adjacent pairs thereof effectively separate apertures 6a from each other. FIG. 6 illustrates more clearly the individual internal chambers 13 which are formed by the pairs of stabilizing discs 10. Stabilizing disc 10a is installed as shown in order to divert the fluid quench stream in conduit 9 such that the same traverses the entire length of inner distribution conduit 6. Between pairs of stabilizing discs 10 are the stagnant areas 12.

The foregoing specification, particularly when read in conjunction with the accompanying drawings, clearly illustrates the fluid distribution device encompassed by our inventive concept. Benefits afforded through its use will become evident to those possessing the requisite skill in the appropriate art.

We claim as our invention:

1. In a catalytic reaction chamber, containing a fixed-bed of catalyst particles, an inner catalyst fluid distribution device which comprises, in cooperative relationship:
   (a) a fluid inlet conduit;
   (b) a first plurality of spaced-apart, perforated fluid distribution conduits in open communication with said fluid inlet conduit and disposed in a plane perpendicular to the vertical plane containing the axis of said fluid inlet conduit;
   (c) a second plurality of perforated fluid distribution conduits, having a nominal diameter greater than said first distribution conduits, one each of which is coaxially and concentrically disposed around each of said first distribution conduits; and
   (d) annular-form, spaced-apart stabilizing discs, having a major diameter substantially the same as the internal diameter of said second distribution conduits, surrounding said first distribution conduits and disposed substantially perpendicular to the longitudinal axis thereof, said adjacent pairs of said stabilizing discs forming individual internal chambers, containing both first and second distribution conduit perforations, along the length of said first and second conduits, and said discs also providing for annular stagnant internal chambers between perforations to impede transfer of heat to the quench fluid.

2. The fluid distribution device of claim 1 further characterized in that said first and second fluid distribution conduits are disposed below said fluid inlet conduit.

3. The fluid distribution device of claim 1 further characterized in that the perforations in said second plurality of conduits have a greater nominal diameter than the perforations in said first plurality of conduits.

4. The fluid distribution device of claim 1 further characterized in that each of said second distribution conduits is encased in a cylindrical, perforated screen member.

5. The fluid distribution device of claim 1 further characterized in that the perforations in said seond distribution conduits are inwardly chamfered.

6. The fluid distribution device of claim 1 further characterized in that the perforations in said first distribution conduits are disposed to discharge against an imperforate portion of said second distribution conduits.

7. The fluid distribution device of claim 6 further characterized in that the perforations in said first distribution conduits are disposed 90° with respect to the vertical axis and the perforations in said second distribution conduits are disposed 30° with respect to the vertical axis.

8. The fluid distribution device of claim 1 further characterized in that it occupies from about 60.0% to about 90.0% of the horizontal cross-sectional area of said reaction chamber.

* * * * *